United States Patent [19]

Marello et al.

[11] 4,155,524

[45] May 22, 1979

[54] DEVICE FOR THE SYNCHRONIZED UNFOLDING OF ARTICULATED ELEMENTS CARRYING SOLAR CELLS IN A PANEL FORMED BY A SERIES OF ARTICULATED ELEMENTS

[75] Inventors: Georges Marello; Jean-Claude Vermalle, both of Mandelieu, France

[73] Assignee: Societe Nationale Industrielle Aerospatiale, France

[21] Appl. No.: 849,021

[22] Filed: Nov. 7, 1977

[30] Foreign Application Priority Data

Nov. 17, 1976 [FR] France ............................... 76 34582

[51] Int. Cl.$^2$ ............................................... B64G 1/30
[52] U.S. Cl. .............................. 244/173; 136/89 SA; 160/188
[58] Field of Search ..................... 244/173, 158, 129.6; 136/89SA; 160/206, 183, 188, 213, 193, 229, 192; 52/71, 70; 114/201 R, 202

[56] References Cited

U.S. PATENT DOCUMENTS

| 3,275,064 | 6/1966 | Hansen | 160/213 |
|---|---|---|---|
| 3,460,992 | 8/1969 | Avilov et al. | 244/173 |
| 3,525,483 | 8/1970 | Van Alstyne | 244/173 |
| 3,733,758 | 5/1973 | Maier et al. | 244/173 |
| 3,941,337 | 3/1976 | Mölter et al. | 244/129.6 |
| 4,068,770 | 1/1978 | Boehringer | 160/213 |

FOREIGN PATENT DOCUMENTS

| 2421902 | 11/1974 | Fed. Rep. of Germany | 114/201 R |
|---|---|---|---|
| 2424412 | 12/1975 | Fed. Rep. of Germany | 114/201 R |

*Primary Examiner*—Galen L. Barefoot
*Attorney, Agent, or Firm*—Thomas J. Greer, Jr.

[57] ABSTRACT

Synchronized angular displacement of articulated elements of an outwardly-extendable solar-cell panel is carried out by means of a device mounted between any two successive panel elements constituting a driving element and a driven element. Two independent and parallel traction members are pivotally mounted on support plates which are rigidly fixed to two successive driving elements. Two link-arms for traction members such as cables are pivotally attached to pins forming anchoring points for the cables. Each support plate has two stationary stops for limiting the angular displacements of the link-arms during the relative pivotal movement of the driven element with respect to the driving element.

6 Claims, 7 Drawing Figures

DEVICE FOR THE SYNCHRONIZED UNFOLDING OF ARTICULATED ELEMENTS CARRYING SOLAR CELLS IN A PANEL FORMED BY A SERIES OF ARTICULATED ELEMENTS

This invention relates to a device for the synchronized unfolding of articulated elements which are usually of flat shape and joined together from one element to the next so as to form a bellows-type folded assembly. Although other applications may be contemplated, elements of this type are preferably adapted to carry solar cells for the supply of electric energy to artificial satellites.

It can readily be understood that flat panels equipped with solar cells and having surfaces of large area must be outwardly extended on each side of a satellite body by means of mechanisms designed to ensure perfect coordination of the movements of the elements constituting the panels. It is thus possible to prevent untimely opening of the panel elements and the resultant potential danger of dynamic effects which would be liable to impair the stability of the satellite and cause damage to the cells or other parts of the satellite as a result of shock. Moreover, the panels must have a very small volume in order to limit the overall dimensions of the satellite, especially during the stage of launching and putting in orbit. The immediate solution to be adopted is consequently one in which the panels to be unfolded are constituted by adjacent articulated elements connected to each other in such a manner as to permit folding and unfolding in the form of a bellows-type assembly in which the above-mentioned panel elements are initially applied against each other.

The present invention is directed to a device for the synchronized unfolding of articulated elements for carrying solar cells in a panel constituted by a series of such elements in such a manner as to permit coordinated relative angular displacement of these different elements within each panel and to ensure that the angle of opening of any given element as measured with respect to the previous element in the series of elements is always equal but of opposite direction with respect to the next and conversely. The invention is also directed to a device for reducing and even eliminating undesirable friction of the articulated elements during relative rotation of these latter with respect to each other. This device is intended to be of light weight, to ensure accurate operation and to take up the smallest possible space when the panel elements are in the position in which they are folded-back to the maximum extent, especially during the satellite launching stage.

A number of different design solutions which are already known meet these requirements at least to a partial extent and offer an appreciable degree of reliability. In particular, it has already been proposed to effect the unfolding of the elements which serve to carry solar cells by making use of mechanisms adapted to cooperate with suitable torsion bars for coordinating the relative movements of rotation of the different articulated elements. These mechanisms comprise at least one traction member such as a cable or the like, said member being connected to pulleys which are each fixed on one element of the panel. Systems of this type are nevertheless subject to disadvantages, especially in the event that a single cable is employed and attached at a point of the periphery of each pulley since accidental escape of the cable from the groove of one of the pulleys is sufficient to make the system inoperative.

The present invention relates to an improved device which dispenses with the use of pulleys carried by the articulated elements. Said pulleys are accordingly replaced by simple mechanical means in which the constructional design and mode of assembly on the different elements of a panel for carrying solar cells make it possible to obtain reliable unfolding, each element being intended to undergo a relative movement of rotation which is identical but takes place in the opposite direction with respect to the following element. The invention also permits unfolding of the articulated elements with a remarkable degree of precision, from a position in which they are completely folded-back against each other to a fully extended position in which all the elements are brought in the common plane of the panel corresponding to a displacement through an angle of 180° with respect to the initial position.

Finally, by virtue of the preferential utilization of a damping system which produces action at the end of travel on at least one of the articulated elements, the invention makes it possible to reduce the final opening speed and to prevent the application of substantial shocks to the panel in the unfolded position prior to interlocking of the elements in the plane of said panel.

With this objective, the device under consideration is adapted to be mounted in each case between any two successive articulated panel elements constituting a driving element and a driven element in alternate sequence, said driving element being associated with at least one drive motor for producing relative angular displacement of the driven element. Said device essentially comprises two independent and parallel traction members each secured at their extremities to two link-arms pivotally mounted respectively on support plates which are rigidly fixed to two successive driving elements in the panel, the two link-arms provided at the extremities of the two traction members being pivotally attached to pins which form anchoring points for said members, each support plate which is rigidly fixed to one element being provided with two stationary stops for limiting the angular displacements of the link-arms during the relative pivotal movement of the driven element with respect to the driving element.

The parallel traction members are thus associated in pairs with each articulated element across the entire panel, each driven element in any one pair of two adjacent elements being intended to become the driving element in the case of the following articulated element and so on in sequence from one element to the next along the length of the panel. As an advantageous feature, the stationary stops and the pins on which the link-arms are pivotally mounted on each support plate are so arranged that a relative movement of rotation of the driven element with respect to the driving element through an angle of 180° is broken down into successive steps of 90° in each case, in which the first link-arm is arrested by one of the stops and causes the movement of rotation of the driven element, then in which the second link-arm is arrested by the other stop and completes the movement of rotation, the two link-arms being caused to carry out symmetrical movements having the same amplitude.

Further distinctive features of a device for the unfolding of articulated elements as constructed in accordance with the invention will become apparent from the following description of one example of construction which is given by way of indication and not in any limiting sense, reference being made to the accompanying drawings, in which.

Figure 1:
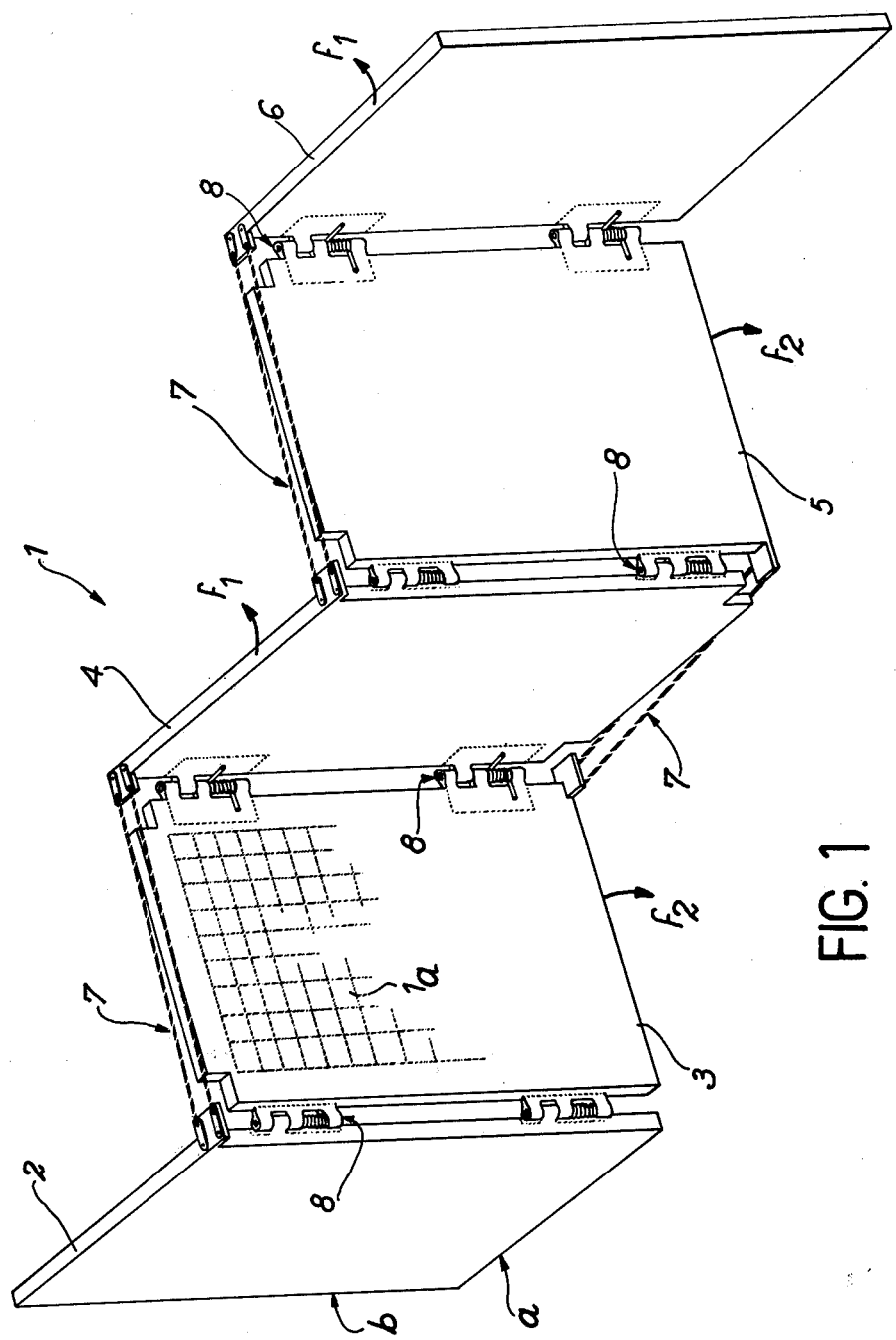
FIG. 1 is a general view in perspective showing a panel for carrying solar cells during unfolding of articulated elements constituting said panel under the action of devices in accordance with the invention.

As can be seen in FIG. 1, the panel under consideration is generally designated by the reference numeral 1 and made up of a series of flat carrier elements carrying solar cells 1a. Said elements are pivotally coupled from each element to the next along the length of the panel and have the general configuration of a bellows-type assembly. In the position of maximum folding-back in which all the elements are applied against each other, said elements accordingly take up the smallest possible space. In the example of construction which is illustrated, the panel 1 comprises four successive articulated carrier elements designated by the reference numerals 3, 4, 5 and 6 and is shown in FIG. 1 during unfolding with respect to a base element 2 which is assumed to form part of a satellite body (not shown in the drawings) or to be an integral part of this latter. As a general rule, the element 2 is constituted by at least two panels of the type illustrated in FIG. 1 and disposed on each side of this latter. For the sake of enhanced simplicity of the drawings, the second panel has not been illustrated but has a constructional design which is similar to the first in every respect. However, said base element 2 against which the other articulated elements are folded-back is also capable of cooperating with a mechanism which is connected to the satellite structure in order to ensure that the elements for carrying solar cells can move away from said structure or else can be replaced by a mechanism of this type (not shown in the drawings). Similarly, although the example of construction illustrated in FIG. 1 shows the panel 1 constituted by four successive carrier elements, the invention is clearly not limited in any sense to the number of articulated elements, this number being limited in certain cases solely by considerations of weight and mechanical strength. Finally, it is worthy of note that, although the articulated elements constituting the panel 1 are illustrated in the figure in the form of flat elements having a rectangular profile, it would be possible to contemplate alternative forms of construction in which said elements would have another shape without thereby departing from the scope of the invention.

All the carrier elements of the panel 1 unfold with respect to each other about pivotal axes which are suitably disposed along their adjacent lateral edges. In consequence, said elements are capable of angular displacement in relative movements represented diagrammatically by the arrows $f_2$ in the case of the elements 3 and 5 which move in the anticlockwise direction and by the arrows $f_1$ in the case of the elements 4 and 6 which perform pivotal displacements in the opposite direction. These two relative movements of the different successive articulated elements in the panel take place as a result of initial folding-back of this latter in a bellows-type assembly and are synchronized in accordance with the invention by means of a set of mechanisms having the same design, one particular example of construction of these mechanisms being given in the remainder of the description.

Figure 2:
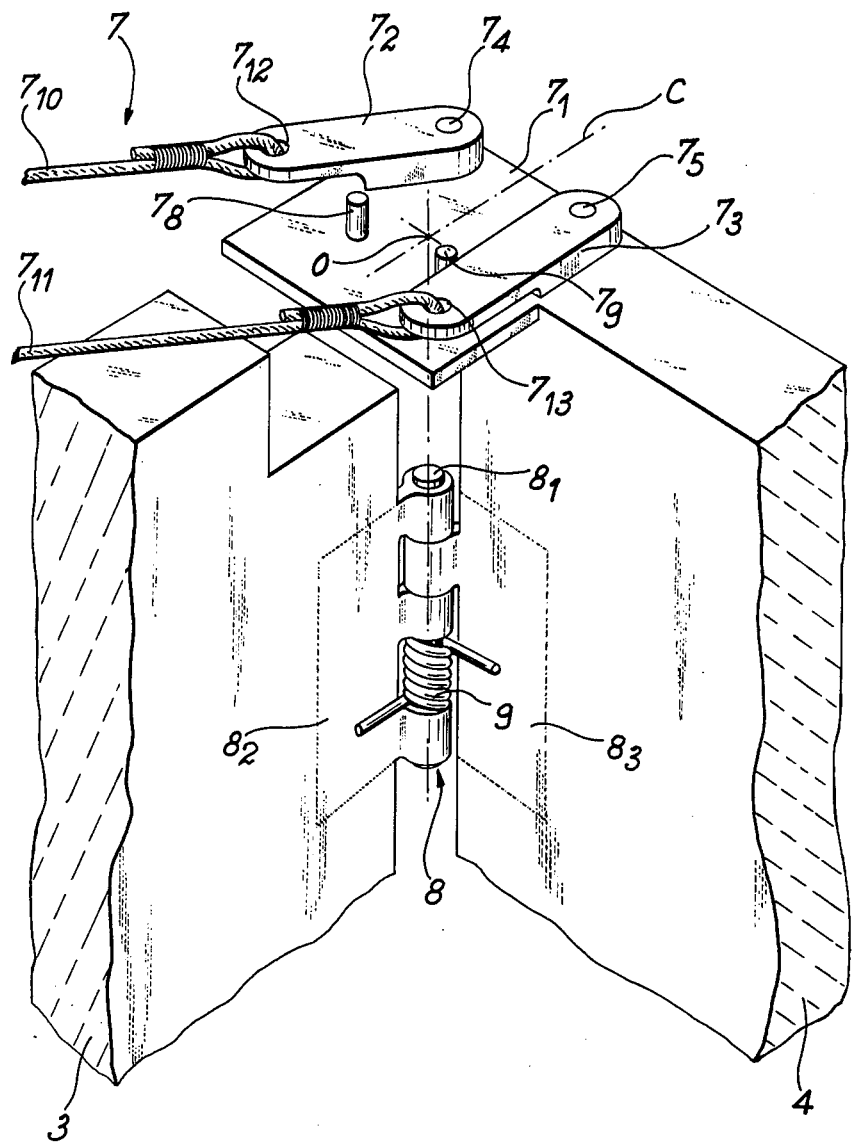
FIG. 2 is a view to a larger scale and also in perspective showing a detail of the device under consideration.

Each operating mechanism which is generally designated by the reference numeral 7 is preferably placed alternately and successively on the top lateral portion and then on the bottom lateral portion of any two adjacent elements as illustrated in FIG. 1. The coordinated movements of opening of the different panels produced by means of at least one driving member associated with a pair of elements can thus be transmitted from one element to the next. Control of angular displacement of any one element with respect to another adjacent element in the panel is transmitted from one element to the next in the series. The use of each operating mechanism 7 can readily be extended to unfolding and synchronization of any number of articulated elements having various dimensions and cooperates with at least one driving device 8. An advantageous feature lies in the fact that the panel 1 can be provided with a number of devices of this type corresponding to the number of pivot-pins. Each driving device is preferably placed opposite to a pivot-pin between each pair of two adjacent elements, the constructional design of a device of this type being illustrated in greater detail in FIG. 2.

As can in fact be seen in this figure, the driving device 8 which is illustrated is mounted in the example under consideration between two successive articulated elements 3 and 4 respectively. The term "driving element" is adopted by convention to designate the element 3 and the term "driven element" is adopted by convention to designate the element 4. In the pair of following articulated elements in the panel, it is readily apparent in accordance with a distinctive feature of the invention that the element 4 will become the driving element and the element 5 will become the driven element and so on in sequence.

The driving device 8 is mainly constituted by a spring 9 placed around a pivot-pin $8_1$. By way of alternative, provision could be made for other means of a similar type placed at any other suitable point between the two elements 3 and 4 so as to cause pivotal displacement of these latter with respect to each other. In the example shown, the relative angular displacement of the articulated elements is carried out by means of two hinges $8_2$ and $8_3$ respectively which are mounted on the pivot-pin $8_1$ and against which the ends of the spring 9 are applied. The mode of winding of said spring is intended to ensure that an opening force is continuously exerted by the driving element 3 on the driven element 4 and tends to bring these two elements in the line of extension of each other in the same plane.

As an advantageous feature, the pivot-pin $8_1$ and the associated driving device 8 are located at the bottom and top ends of the lateral sides of two successive articulated elements in order to balance the forces applied and to limit the total length of the articulation. An appreciable economy is thus achieved in the total weight and is particularly highly valued within the scope of the application which is more especially contemplated, namely that of an artificial satellite. Similarly, the carrier element 2 against which the other articulated elements of each panel are folded-back in the initial position can be connected to the satellite body by means of an articulation or anchoring device of known type (not shown). Depending on the extent of outward unfolding which is contemplated, the device aforesaid can be placed along the short side a or the long side b of said element 2 or else can produce action simultaneously on the sides a and b (as shown in FIG. 1).

Figures 3, 4:
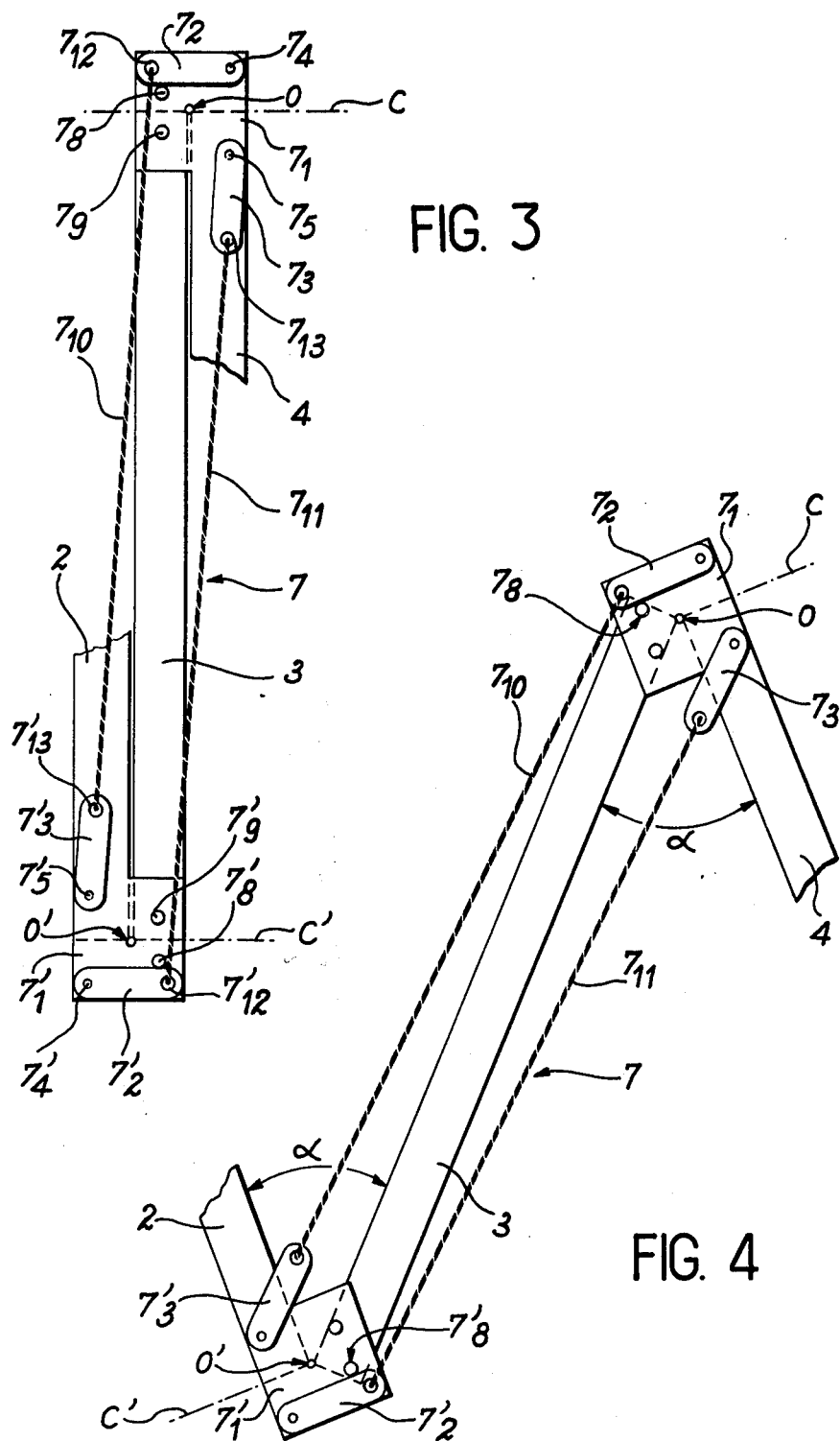
FIGS. 3, 4, 5 and 6 are plan views providing explanatory illustrations of the practical application of the device for unfolding three consecutive articulated elements in the panel of FIG. 1.

Referring again to FIG. 2 and also to FIG. 3 in which the three successive articulated elements 2, 3 and 4 in the panel are illustrated in plan to a larger scale, the figures show the design and constructional arrangement of the mechanism 7 which makes it possible in accordance with the invention to carry out combined movements of unfolding between these three elements. In particular, this mechanism comprises two support plates $7_1$ and $7'_1$ respectively. As shown partly in FIG. 2 in the case of a support plate $7_1$, said plates are each flush-mounted in one element of the panel. The support plate $7_1$ is thus fixed on the top edge of the element 4 whilst the support plate $7'_1$ is rigidly fixed to the element 2 in a similar manner.

Each support plate $7_1$ or $7'_1$ is rigidly fixed to the corresponding element by known means such as screws (not shown). When viewed in plan, each support plate preferably has a square shape which can clearly vary according to the possibilities of flush-mounting or overall size of the mechanism. Two stops designated respectively by the references $7_8$ and $7_9$ in the case of the support plate $7_1$ and by the references $7'_8$ and $7'_9$ in the case of the support plate $7'_1$ are provided on these latter in order to limit the displacements of two pairs of link-arms designated respectively by the references $7_2$ and $7_3$ in the case of the support plate $7_1$ and by the references $7'_2$ and $7'_3$ in the case of the support plate $7'_1$. Thus the support plate $7_1$ is provided with two stops $7_8$ and $7_9$ located on each side of a reference line C which passes through the point projection of the common articulation of the elements 3 and 4 as shown in FIG. 3 and in greater detail in FIG. 7. The stops $7_8$ and $7_9$ are preferably located at two symmetrical points with respect to the reference line C but could be defined and placed at other points in different forms of construction. The pair of link-arms $7_2$ and $7_3$ which is mounted on the support plate $7_1$ is connected to this latter by means of two pivot-pins $7_4$ and $7_5$ respectively, the link-arms $7'_2$ and $7'_3$ being pivoted to the support $7'_1$ about pins $7'_4$ and $7'_5$.

The four above-mentioned link-arms cooperate in pairs with two independent and parallel traction members $7_{10}$ and $7_{11}$ extending parallel to the top side of the element 3. Thus the link-arms $7_2$ and $7_3$ associated with the support plate $7_1$ are securely attached at the extremities $7_{12}$ and $7_{13}$ opposite to those which are pivotally mounted at $7_4$ and $7_5$ to two cables or the like which constitute the traction members $7_{10}$ and $7_{11}$, the pivot-pins $7_4$ and $7_5$ being intended to form two first anchoring points for these traction members. Similarly, the link-arms $7'_2$ and $7'_3$ of the support plate $7'_1$ are securely attached at their extremities $7'_{12}$ and $7'_{13}$ to the same traction members $7_{10}$ and $7_{11}$ and form two further anchoring points for these members by means of their pivot-pins $7'_4$ and $7'_5$.

By virtue of these arrangements, the unfolding of the articulated elements in perfectly coordinated movements is carried out by the different link-arms which take up different relative positions during control of the opening of the panel 1. As shown in particular in FIGS. 3 and 4 in the first stage of opening, the link-arms $7_2$ and $7'_2$ remain continuously in contact and applied against their respective stops $7_8$ and $7'_8$ as the angle α which measures the relative angular displacement between the articulated elements varies between 0°, namely the position in which all the elements are folded-back as illustrated in FIG. 3, and 90° in the position shown in FIG. 4. In the following stage (shown in FIGS. 5 and 6), said link-arms $7_2$ and $7'_2$ move away from the stops $7_8$ and $7'_8$ when the angular displacement corresponds to an angle $α_2$ which is larger than 90°, in which case the link-arms rotate about their pivot-pins $7_4$ and $7'_4$.

Figure 5:
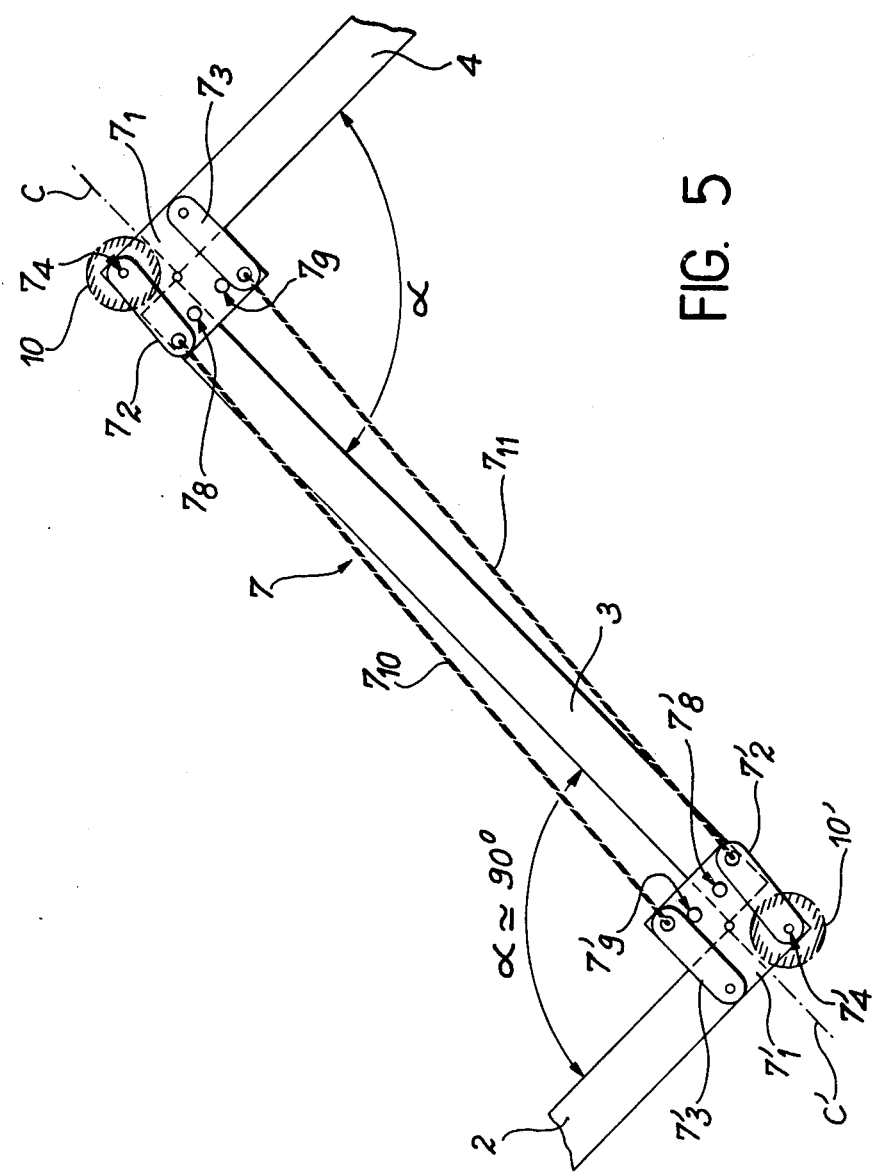
Figure 6:
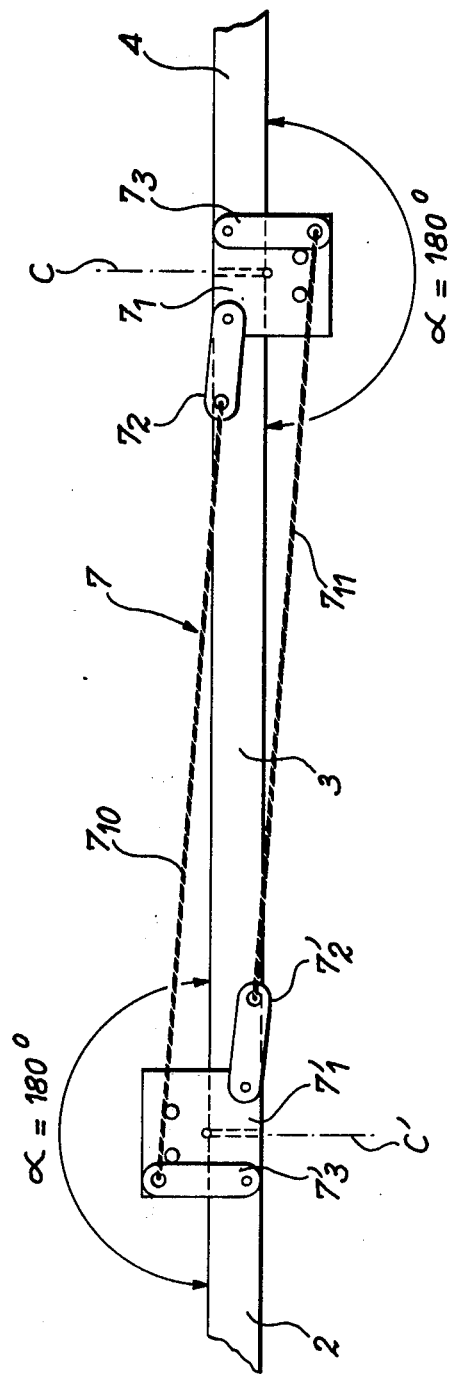

Correlatively, the link-arms $7_3$ and $7'_3$ come closer to their respective stops $7_9$ and $7'_9$ in the first stage so as to come into contact with these latter when the angle of rotation α attains 90° (as shown in FIG. 5). In the following stage, the link-arms aforesaid are maintained in a stationary position by means of their stops until final opening of the panel which is obtained when all the articulated elements are placed in the same plane corresponding to a total rotation through an angle of 180° (as shown in FIG. 6).

These different movements thus determine in the case of each pair of two link-arms associated with one and the same support rigidly fixed to any one element a movement which is resolved into two successive stages separated from each other at the moment when the driven element makes a relative angle of 90° with the driven element. Within these stages, each link-arm is alternately in contact and applied against one of its two stops, then moves away from this latter and rotates about its pivot-pin whilst the other link-arm carries out reverse movements at the same time.

Figure 7:
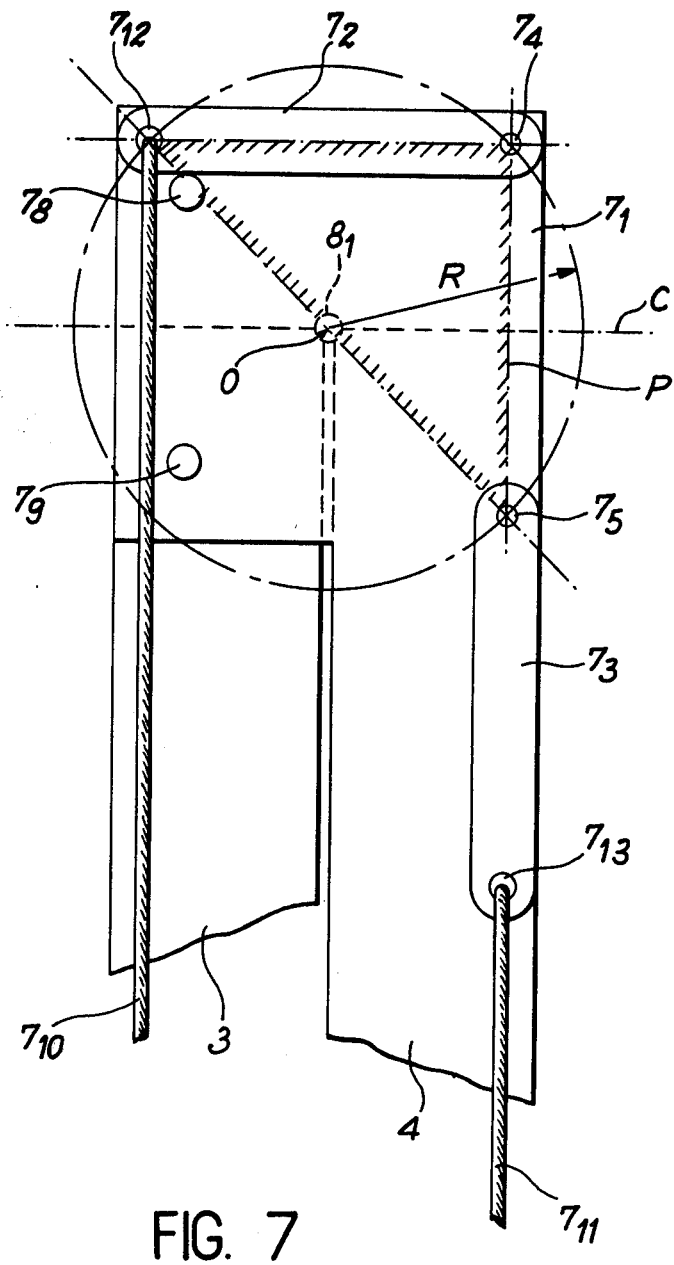
FIG. 7 is a view to a larger scale showing another detail of the device.

The kinematics of motion of the link-arms as described in the foregoing essentially results from the particular arrangement of the pivot-pins and of the point of connection of each link-arm with its traction member. FIG. 7 accordingly shows by way of example in the case of the support plate $7_1$ that the pivot-pin $7_4$ and the connecting point $7_{12}$ of the link-arm $7_2$ which is applied against its stop $7_8$ form in conjunction with the pivot-pin $7_5$ of the link-arm $7_3$ the vertices of a right-angled isosceles triangle P in which the sides of the right angle are located on each side of the pivot-pin $7_4$ which is in turn placed symmetrically with respect to the pivot-pin $7_5$ on each side of the reference line C. Said right-angled isosceles triangle P is inscribed within a circle having a radius R such that the center O located at the mid-point of its hypotenuse is in alignment with the pivot-pins $8_1$ of the two consecutive elements 3 and 4. Moreover, said right-angled triangle which is alternately defined during each unfolding stage by one link-arm and then the other link-arm of one and the same support plate rotates about its own axis and about the center O in the same direction as that defined by the rotation of its support plate. During operations, this accordingly ensures transmission of pivotal-motion forces without play and without slippage from the driving element to the driven element and so on in sequence along the entire length of the panel.

When all the articulated elements of the panel 1 are about to reach the fully open position, it is an advantage to make use of means for limiting the final speed of these elements. In fact, these articulated elements are liable to be subjected to a shock impact resulting from sudden stopping at the end of the opening travel of the panel. This is liable in some cases to cause damage, especially to the solar cells carried by these elements. In order to overcome this disadvantage, a speed-regulating device of known type such as springs or the like can advantageously be mounted on each element so as to produce action only at the end of the opening stage of each element. A device of this type can be placed opposite to a link-arm articulation and can be rigidly fixed to said link-arm.

By way of example, FIG. 5 illustrates one mode of application of the aforementioned device which is placed around the pivot-pins $7_4$ and $7'_4$ of the link-arms $7_2$ and $7'_2$ on the support plates $7_1$ and $7'_1$. This device is shown diagrammatically at 10 and 10' and produces action on the mechanism in such a manner as to prevent rapid angular displacement of the link-arms $7_2$ and $7'_2$ at the end of travel.

The traction members employed in the previous embodiment are preferably two independent cables; however, depending on the particular conditions of use, it can prove advantageous to replace these latter by rods of metal or of composite material. The traction members could also be constituted by means of an assembly formed of link-arms and cables.

As mentioned in the foregoing, the use of a single driving member across all the elements of the panel makes it possible to obtain unfolding of the panel as a whole as a result of interaction of the different connection and traction members provided between these different elements. The addition of further driving members to the articulations of all the elements in the manner illustrated in FIG. 1 therefore makes it possible to achieve enhanced operational safety. Moreover, the driving members aforesaid can be reversible so as to ensure unfolding followed by folding-back of the articulated elements in the panel.

What we claim is:

1. A device for the synchronized unfolding of flat, articulated, carrier elements adapted to carry solar cells of a satellite in a panel, the panel formed by a series of said elements, the panel movable away from the structure of a satellite said device being adapted to be mounted between any two successive articulated carrier elements of the panel, any two successive carrier elements constituting, alternately, a driving carrier element and a driven carrier element, said driven element being associated with at least one driving element for causing the relative angular displacement of the driven element by means of traction members, said device comprising two independent and parallel traction members each secured at their extremities thereof to two link-arms pivotally mounted respectively on support plates, which plates are, respectively rigidly fixed to two successive driving elements in the panel, the two link-arms provided at the extremities of the two traction members being pivotally mounted on pins forming anchoring points for said members, each support plate which is rigidly fixed to one carrier element being provided with two stationary stops for limiting the angular displacements of the link-arms during relative pivotal movement of the driven element with respect to the driving element.

2. A device according to claim 1, wherein the stationary stops and the pins on which the link-arms are pivotally mounted on each support plate are so arranged that a relative movement of rotation of the driven element with respect to the driving element through an angle of 180° is broken down into successive steps of 90° in each case, in which the first link-arm is arrested by one of the stops and causes the movement of rotation of the driven elements, then in which the second link-arm is arrested by the other stop and completes the movement of rotation, the two link-arms being caused to carry out symmetrical movements having the same amplitude.

3. A device according to claim 1, wherein the pivot-pin of each link-arm and the point of connection of the link-arm to its traction member in the position in which said link-arm is applied against one of its stops form the vertices of a right-angled isosceles triangle with the pivot-pin of the other link-arm which is placed on the same support plate, the sides of the right angle of said triangle being located on each side of the pivot-pin of the first link-arm aforesaid, said triangle being inscribed within a circle having a center which is in alignment with the pivot-pin of two successive elements in the panel and being intended to rotate on its own axis about said center in the same direction as the support plate in order to ensure torque transmission from the driving element to the driven element without play or slippage.

4. A device according to claim 1, wherein the two traction members are cables.

5. A device according to claim 1, wherein the two traction members are link-arms.

6. A device according to claim 1, wherein the two traction members consist of at least one link-arm and one cable which are employed at the same time.

* * * * *